(12) United States Patent
Takabayashi (10) Patent No.: US 8,585,814 B2
(45) Date of Patent: Nov. 19, 2013

(54) ACTIVE RAY CURABLE INK-JET INK, IMAGE FORMING METHOD AND INK-JET RECORDING APPARATUS USING THE SAME

(75) Inventor: Toshiyuki Takabayashi, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 810 days.

(21) Appl. No.: 11/918,129

(22) PCT Filed: Mar. 29, 2006

(86) PCT No.: PCT/JP2006/306408
§ 371 (c)(1),
(2), (4) Date: Oct. 10, 2007

(87) PCT Pub. No.: WO2006/112241
PCT Pub. Date: Oct. 26, 2006

(65) Prior Publication Data
US 2009/0291225 A1    Nov. 26, 2009

(30) Foreign Application Priority Data
Apr. 14, 2005  (JP) ................................. 2005-116773

(51) Int. Cl.
*C09D 11/00* (2006.01)
(52) U.S. Cl.
USPC ........................................ 106/31.13; 427/487
(58) Field of Classification Search
USPC ........................................ 427/487; 106/31.13
See application file for complete search history.

(56) References Cited

U.S. PATENT DOCUMENTS

| 2004/0099170 A1 * | 5/2004 | Takabayashi .................. 101/491 |
| 2004/0101291 A1 | 5/2004 | Takabayashi et al. |
| 2004/0132862 A1 * | 7/2004 | Woudenberg .................. 523/160 |

FOREIGN PATENT DOCUMENTS

| EP | 540203 A1 * | 5/1993 |
| JP | 06-200204 | 7/1994 |
| JP | 2000-504778 | 4/2000 |
| JP | 2001-201851 | 7/2001 |
| JP | 2003-191594 | 7/2003 |
| JP | 2004-009360 | 1/2004 |
| JP | 2004-181951 | 7/2004 |
| JP | 2004-182808 | 7/2004 |
| JP | 2004182808 A * | 7/2004 |
| JP | 2004-285216 | 10/2004 |
| JP | 2004-285217 | 10/2004 |

(Continued)

OTHER PUBLICATIONS

James "Advanced Polyols and Dendritic Polymers for Radiation Curing: Allying Improved Performances with Safety and Environmental Compliance" paper presented at Parquet Coating II, European Coating Conference, Nov. 2002, paper available online at least as early as Mar. 11, 2006.*

(Continued)

*Primary Examiner* — Robert S Walters, Jr.
(74) *Attorney, Agent, or Firm* — Finnegan, Henderson, Farabow, Garrett & Dunner, L.L.P.

(57) ABSTRACT

A active ray curable ink-jet ink includes a multifunctional acrylate or methacrylate of at least three functional groups, and the acrylate or the methacrylate has a partial structure of the following Formula (1) in an amount of 5-40 weight % based on the total weight of the active ray curable ink-jet ink: Formula (1)—(R—O—)$_n$—, wherein R is an alkylene group, and n is an integer of at least three.

9 Claims, 1 Drawing Sheet

(56) References Cited

FOREIGN PATENT DOCUMENTS

| WO | WO 97/031071 | | 8/1997 |
|----|----|----|----|
| WO | WO 9929788 | A1 * | 6/1999 |
| WO | WO 2004026978 | A1 * | 4/2004 |
| WO | WO 2004031308 | A1 * | 4/2004 |

OTHER PUBLICATIONS

Office Action for Japanese Patent Application No. 2007-521155 mailed Nov. 1, 2011.

* cited by examiner

ACTIVE RAY CURABLE INK-JET INK, IMAGE FORMING METHOD AND INK-JET RECORDING APPARATUS USING THE SAME

FIELD OF THE INVENTION

The present invention relates to an active ray curable ink-jet ink printable onto various kinds of recording medium, and an image forming method and an ink-jet recording apparatus which employ the same.

BACKGROUND OF THE INVENTION

In the recent years, ink-jet recording systems, which enable simple formation of images at low cost, have been applied to printing fields such as photography, various types of printing, and special printing such as marking and color filters. Specifically, by employing ink-jet recording apparatuses which eject controlled minute dots of ink, ink-jet inks which have been improved in color reproduction, durability, and ejection adaptability, and specialized paper media which have been enhanced in color forming properties of colorants and surface glossiness, it has become possible to achieve image quality comparable to conventional silver halide photography. Image quality of the present ink-jet recording systems is enhanced only when an ink-jet recording apparatus, an ink-jet ink and a specialized paper medium are simultaneously improved.

However, ink-jet systems which require specialized kinds of paper result in problems such that the recording media are limited and using such recording media increases cost. Accordingly, many trials have been made in which recording, employing the ink-jet systems, is carried out on transfer media of differing specialized kinds of paper. Specific systems include a phase-changing ink-jet system employing a wax ink which is solid at room temperature, a solvent based ink-jet system employing, as a main component, rapidly drying organic solvents, and an active ray curable ink-jet system in which, after recording, active rays such as ultraviolet rays (UV) are exposed onto the deposited ink to result in cross-linking.

Of these, the UV ray curable ink-jet system results in relatively low unpleasant odor, compared to a solvent based ink-jet system, and start to garner attention in recent years because of quick drying and being possible to print onto a recording medium exhibiting no ink absorbability. Various type of ultraviolet ray curable inks are proposed. (Please refer to, for example, Patent Documents 1 and 2.)

However, even though these ink-jet inks are employed, the dot diameter after deposition of ink droplets markedly varies, whereby it has been impossible to consistently form highly detailed images on various recording media in various working environments.

In ultraviolet ray curable inks, there is, for example, a radically polymerizable ultraviolet ray curable ink mainly containing an acrylic composition.

A radically polymerizable ultraviolet ray curable ink is, in polymerization mechanism, subjected to the oxygen inhibiting action in the environment the presence of oxygen, resulting in problems of deterioration of image quality due to reduced curability and also problems of wrinkling in the cured film or curling of a recording medium due to large curability shrinkage.

Patent Document 1: Unexamined Japanese Patent Application No. (hereinafter, referred to as JP-A) 6-200204.

Patent Document 2: Japanese Translation of PCT International Application Publication No. 2000-504778.

SUMMARY OF THE INVENTION

Problems to be Dissolved by the Invention

An object of the present invention is to provide an active ray curable ink-jet ink which can reproducibly form a high-definition image without damaging texture of a printed matter even when a curable ink by active rays is employed to print onto various recording media with an ink-jet recording method, and to provide an image forming method and an ink-jet recording apparatus using the active ray curable ink-jet ink.

Means to Solve the Problems

The above object of the present invention was achieved via the following embodiments.

1. An active ray curable ink-jet ink comprising a multifunctional acrylate or methacrylate of at least three functional group, and the acrylate or methacrylate has a partial structure of the following Formula (1) in an amount of 5-40 weight % based on the total weight of the ink-jet ink:

Formula (1)

wherein R is an alkylene group, and n is an integer of at least three.

2. The active ray curable ink-jet ink described in 1. above, further comprising a bifunctional acrylate or methacrylate having a partial structure of above Formula (1) in an amount of 30-80 weight % based on the total weight of the ink-jet ink.

3. The active ray curable ink-jet ink described in 1. or 2. above, further comprising a monofunctional acrylate or methacrylate compound, a content [M (weight %)] of which is 0<M<20, and a bifunctional acrylate or methacrylate in an amount of 70-95 weight % based on the total weight of the ink-jet ink.

4. The active ray curable ink-jet ink described in any one of 1.-3. above, further comprising at least one kind of tertiary amine compound.

5. The active ray curable ink-jet ink described in any one of 1.-3. above, further comprising at least one kind of photopolymerizable tertiary amine monomer.

6. The active ray curable ink-jet ink described in any one of 1.-5. above, exhibits a viscosity of 10-70 mPa·s at 25° C.

7. An image forming method comprising the steps of:
   (a) ejecting the active ray curable ink-jet ink described in any one of 1.-6. from an ink-jet recording head onto a recording medium, and
   (b) curing the ejected ink to form an image,
   wherein active rays are irradiated between 0.001-1.0 second after the ejected active ray curable ink-jet ink is deposited onto the recording medium.

8. The image forming method of 6. above, wherein the total thickness of the cured ink layer is 2-20 μm.

9. An image forming method comprising the steps of:
   (a) ejecting the active ray curable ink-jet ink described in any one of 1.-6. from nozzles of an ink-jet recording head onto a recording medium, and
   (b) curing the ejected ink to form an image,
   wherein a droplet volume of ink ejected from the nozzles is 1-15 pl.

10. The image forming method described in 6.-9. above, wherein the recording medium is a non-absorbable recording medium.

11. An ink-jet recording apparatus employed with the image forming method described in 7.-10. above, wherein an active ray curable ink-jet ink is ejected after the active ray curable ink-jet ink and an ink-jet recording head are heated to 35-100° C.

Effects of the Invention

According to the present invention, a high-definition image can be obtained without damaging texture of a printed matter even when an ink-jet printing is conducted onto various recording media.

DESCRIPTION OF SYMBOLS

| | |
|---|---|
| 1 | Recording apparatus |
| 2 | Head carriage |
| 3 | Recording head |
| 4 | Active ray irradiation means |
| 5 | Platen portion |
| 6 | Guide member |
| P | Recording medium |

DESCRIPTION OF THE PREFERRED EMBODIMENT

The inventor of this invention found that an ink-jet ink exhibited dramatically enhanced curability when a multi-functional (meth)acrylate of more than trifunctional having a partial structure represented by Formula (1) was incorporated 5-40 weight %, resulting in not only no generation of wrinkling and curling of a recording medium at curing of the ink but also formation of a high quality image with very good reproducibility due to the enhancement of ink ejection stability. Further, it was found to be specifically preferable that a bifunctional acrylate having a partial structure of Formula (1) is incorporated in an amount of 30-80 weight %. And, an ink-jet image forming method of this invention employing the ink is specifically effective when the ink droplet volume ejected from each nozzle of the recording head is as little as 1-15 pl, and when the recording medium is a non-absorptive recording medium, such as a plastic film.

Hereafter, the present invention is described in detail.

First, the active ray curable ink-jet ink of the present invention (hereinafter, simply referred to as "the ink of the present invention") is described from the constituent materials.

In this invention, a multifunctional (meth)acrylate of more than trifunctional having a partial structure of Formula (1) of this invention is needed to be contained in the ink as a polymerizable monomer and to be in an amount of 5-40 weight % based on the total weight of the ink.

(Polymerizable Monomer)

heretofore, a (meth)acrylate having a partial structure of n=1 or 2 in Formula (1), or a bifunctional (meth)acrylate having a partial structure of n=3 or more, or a monofunctional (meth)acrylate is mainly employed in the ink-jet ink, however, there have been problems of wrinkling generation, curing of the recording medium during ink curing, and unstable ink ejection. In this invention, these problems are overcome by containing a multifunctional (meth)acrylate of more than trifunctional having a partial structure of Formula (1) in an amount of 5-40 weight %, and specifically preferred is in an amount of 10-30 weight % from the viewpoint of the effects of this invention, and scratch resistance of the cured layer after photo-curing.

First, a multifunctional (meth)acrylate having a partial structure of Formula (1) will be described.

"R" in Formula (1) is an alkylene group, but preferable is an alkylene group of 2-4 carbon atoms, and further, —(—CH$_2$CH$_2$O—)$_n$— or —[—CH$_2$CH(CH$_3$)O—]$_n$— (wherein "n" is an integer of 3 or more) is more preferable.

Further, in this invention, it is still more preferable to contain 30-80 weight % of bifunctional (meth)acrylate having a partial structure of Formula (1) together with the above bifunctional (meth)acrylate. Further, it is preferable to contain a monofunctional acrylate or a methacrylate compound and a bifunctional acrylate or a methacrylate compound, and a content [being M (weight %)] of the monofunctional acrylate or a methacrylate compound is 0<M<20, and also it is specifically preferable to contain a bifunctional acrylate or a methacrylate compound in an amount of al least 70 weight % and at most 95 weight %.

As a multifunctional (meth)acrylate of more than trifunctional having a partial structure of Formula (1), any well-known thing can be employed, and listed are, for example, trimethylol propane triethyleneoxide modified tri(meth)acrylate, ditrimethylolpropane triethyleneoxide modified tetra (meth)acrylate, trimethylolpropane tripropyleneoxide oxide adduct, tri(meth)acrylate, triethylene glycol addition pentaerythritol tri(meth)acrylate, triethylene glycol addition pentaerythritol tetra(meth)acrylate, triethylene glycol addition pentaerythritol hexa(meth)acrylate.

Further, all well-known bifunctional (meth)acrylate having a partial structure of Formula (1) can be employable, cited are for example, tripropylene glycol di(meth)acrylate, tetraethylene glycol di(meth)acrylate, polyethylene glycol di(meth)acrylate, polypropylen glycol di(meth)acrylate.

Further, in this invention, any well-known acrylate can use employed together with an acrylate having a partial structure of Formula (1). Cited are, for example, a monofunctional monomer, such as i-amyl acrylate, stearyl acrylate, lauryl acrylate, octyl acrylate, decyl acrylate, i-myristil acrylate, i-stearyl acrylate, 2-ethylhexyl diglycol acrylate, 2-hydroxybutyl acrylate, 2-acryloyloxy ethylhexahydro phthalic acid, butoxyethyl acrylate, ethoxydiethylene glycol acrylate, methoxydiethylene glycol acrylate, methoxypolyethylene glycol acrylate, methoxypropylene glycol acrylate, phenoxy ethyl acrylate, tetrahydrofurfuryl acrylate, i-bornyl acrylate, 2-hydroxyethyl acrylate, 2-hydroxypropyl acrylate, 2-hydroxy-3-phenoxypropyl acrylate, 2-acryloyloxyethyl acid, 2-acryloyloxy ethylphthalic acid, 2-acryloyloxyethyl-2-hydroxyethyl phthalic acid, lactone modified flexible acrylate, and t-butylcyclohexyl acrylate; a bifunctional monomer, such as 1,4-butanediol diacrylate, 1,6-hexanediol diacrylate, 1,9-nonanediol diacrylate, neopentyl glycol diacrylate, dimethylol tricyclodecane diacrylate, EO adduct diacrylate of bisphenol A, PO adduct diacrylate of bisphenol A, hydroxy pivalic acid neopentylglycol diacrylate, and polytetramethylene glycol diacrylate; and a multifunctional monomer of more than trifunctional, such as trimethylolpropane triacrylate, EO modified trimethylolpropane triacrylate, pentaerythritol triacrylate, pentaerythritol tetraacrylate, dipentaerythritol hexaacrylate, ditrimethylolpropane tetraacrylate, glycerol propoxy triacrylate, caprolactone modified trimethylolpropane triacrylate, pentaerythritolethoxy tetraacrylate, caprolactam modified dipentaerythritol hexaacrylate.

In addition to these, polymerizable oligomers can also be blended as similar to the monomers. As a polymerizable oligomer, cited are epoxy acrylate, aliphatic urethane acrylate, aromatic urethane acrylate, polyester acrylate, and a normal chain acrylic oligomer.

(Tertiary Amine Compound)

Further, in this invention, it is preferable to incorporate a tertiary amine compound in the ink in addition to the above polymerizable monomer to suppress ink shrinkage during curing. As an employable tertiary amine compound, any compound all three of which hydrogen atoms of ammonia are substituted with an alkyl group, a hydroxyalkyl group, or an aralkyl group respectively, and all of such well-known compounds can be employed. Specific examples of the tertiary amine compounds include triethylamine, tripropylamine, tributyl amine, dimethylethanolamine, diethylethanolamine, triethanolamine, N,N-dimethylbenzylamine, N,N-diethylbenzylamine, and N,N-dimethylphenethylamine.

In this invention, it is preferable to add a photopolymerizable tertiary amine monomer for the purpose to suppress curing shrinkage. The tertiary photopolymerizable amine monomer is a compound in which a tertiary amino group is attached to the above polymerizable monomer, and examples of the polymerizable tertiary amine monomer include, for example, N-ethyl(meth)acrylamide, N-propyl(meth)acrylamide, N-i-propyl(meth)acrylamide, N-cyclopropyl(meth) acrylamide, N-methyl-N-ethyl(meth)acrylamide, N,N-dimethyl-(meth)acrylamide, N,N-diethyl(meth)acrylamide, N,N-dimethylaminoethyl(meth)acrylate, N,N-dimethylaminopropyl(meth)acrylamide, N-methyl-N-isopropyl(meth) acrylamide, N-methyl-N-n-propyl(meth)acrylamide, N-(meth)acryloyl morpholine, N-(meth)acryloyl pyrrolidine, N-(meth)acryloyl piperidine, N-vinyl-2-pyrrolidone, N-methylenebis acrylamide, N-methoxy propyl(meth)acrylamide, N-i-propoxypropyl(meth)acrylamide, N-ethoxypropyl (meth)acrylamide, N-i-methoxymethyl propyl(meth)acrylamide, N-methoxyethoxy propyl(meth)acrylamide, N-i-methyl-2-methoxyethyl(meth)acrylamide, N-methyl-N-propyl (meth)acrylamide, and N-(1,3-dioxolane-2-yl)(meth) acrylamide, however it is limited to thereof.

(Optical Initiator)

The active ray curable ink-jet ink of this invention, incorporates an optical initiator to initiate photopolimerization, and examples of which include a conventionally well-known initiator, such as an arylalkyl ketone, an oxime ketone, a thiobenzoic acid-S-phenyl, a titanocene, an aromatic ketone, a thioxanthone, a quinone derivative, and keto coumarin. With respect to the initiator, it is detailed in "Application UV-EB Curing Technology and Market" (published by CMC Publishing Co., Ltd., supervised by Yoneho Tabata/edited by Rad Tech Japan). Of these, an acyl phosphine oxide and an acyl phosphonate exhibit high sensitivity, and absorption may decrease according to the optical cleavage of an initiator, they are specifically effective in internal curing with the ink image which has a thickness of 5-12 μm per color like an ink-jet system. Specifically, bis(2,4,6-trimethylbenzoyl)phenylphosphine oxide, and bis(2,6-dimethoxybenzoyl)-2,4,4-trimethyl-pentylphosphine oxide are preferable.

Further, by the preferences in consideration of safety, as similar to the above monomer, 1-hydroxy-cyclohexylphenyl ketone, 2-methyl-1-[4-(methylthio) phenyl]-2-molypholinopropane-1-one, bis(2,6-dimethoxybenzoyl)-2,4,4-trimethyl-pentylphosphine oxide, and 2-hydroxy-2-methyl-1-phenyl-propane-1-one [namely Dalocure (registered trademark) 1173] are suitably employed.

In this invention, it is preferable to divide irradiation into two steps with changing wavelength or strength from a viewpoint of raising the adhesion property and following capability to the base material of the ink, and with respect to the photo initiator, it is specifically preferable that at least two kinds of different absorbing wavelength are employed in combination with. The preferable added amount of the photo initiator is 1-6 weight % based on the total weight of the ink, and preferably 2-5 weight %.

(Pigment)

The ink of this invention incorporates various kinds of well-known dyes or/and pigments, but preferably incorporates pigments.

Preferable pigments utilized in this invention are listed below.

C. I. Pigment Yellow-1, 2, 3, 12, 13, 14, 16, 17, 73, 74, 75, 81, 83, 87, 93, 95, 97, 98, 109, 114, 120, 128, 129, 138, 150, 151, 154, 180, and 165, C. I. Red-5, 7, 12, 22, 38, 48:1, 48:2, 48:4, 49:1, 53:1, 57:1, 63:1, 101, 122, 123, 144, 146, 168, 184, 185, and 202, C. I. Pigment Violet-19, and 23, C. I. Pigment Blue-1, 2, 3, 15:1, 15:2, 15:3, 15:4, 18, 22, 27, 29, and 60, C. I. Pigment Green-7, and 36, C. I. Pigment White-6, 18, and 21, C. I. Pigment Black-7, For the purpose of dispersion of the above pigments, devices such as a ball mill, a sand mill, an atliter, a roll mill, an agitator, a Henschel mixer, a colloidal mill, an ultrasonic homogenizer, a pearl mill, a wet-jet mill and a paint shaker may be utilized. Further, it is also possible to incorporate a dispersing agent at the time of dispersion of the pigments. As a dispersing agent, preferably utilized is a polymer dispersing agent which includes the Solsperse series produced by Avecia Corp. and PB series produced by Ajinomoto Fine-Techno Co., Inc. Further, a synergist corresponding to various types of pigment (being a pigment derivative) as a dispersion aid may also be utilized.

These dispersing agents and dispersion aids are preferably added at 1-50 weight parts based on 100 weight parts of pigment. A solvent or a polymerizing compound may be utilized as a dispersion medium, however, in an active ray curable ink utilized in this invention, a solvent-free type is preferred since reaction and curing are performed immediately after ink deposition. When any solvent remains in a cured image, caused may be problems such as of deterioration of solvent resistance and of VOC (Volatile organic Compounds) problem of a residual solvent. Therefore, a dispersion medium is preferably not a solvent but a photo polymerizable compound, and monomers exhibiting the lowest viscosity among them is more preferably selected with respect to dispersion adaptability.

For dispersion of the pigments, it is preferable to make the pigment particles size 0.08-0.5 μm, and selection of pigment, a dispersing agent and a dispersion medium, dispersion condition, and filtration condition are appropriately set so as to make the maximum particle size be 0.3-10 μm, but preferably be 0.3-3 μm. Via such particle size control, clogging of head nozzles is reduced, and storage stability, transparency and curing sensitivity of ink can be ensured.

In the ink of this invention, the pigment concentration is preferably 1-10 weight % based on the total weight of the ink.

In the ink of this invention, various additives other than those noted above may be utilized. For example, added may be a surface active agent, a leveling additive, a matting agent; and a polyester type resin, polyurethane type resin, vinyl type resin, acrylic type resin, rubber type resin and waxes to optimally adjust physical film properties.

The ink of this invention is preferably exhibit viscosity of 10-70 mPa·s at 25° C. to obtain good curing capability. Viscosity of this invention means a shear rate 1000 (1/s) value measured with a Viscosity Measuring Instrument (being a Rheometer) Physica MCR 300 manufactured by Anton Paar GmbH.

(Recording Medium)

As a recording medium employable in this invention, a non-absorptive recording medium, in addition to such as ordinary non-coated paper and coated paper, may be employed, however, various non-absorptive plastics and films thereof which do not substantially absorb the inks, and are employed for so-called soft packaging, are preferable. Cited as various plastic films are, for example, PET (polyethylene terephthalate) film, OPS (drawn polystyrene) film, OPP (drawn polypropylene) film, ONy (drawn nylon) film, PVC (polyvinyl chloride) film, PE (polyethylene) film, and TAC (triacetyl cellulose) film. As other plastic films, employed may be a polycarbonate, an acryl resin, an ABS (acrylonitril.butadiene.styrene copolymer), a polyacetal, a PVA (polyvinyl alcohol), and rubbers. Further, metals and various types of glass can be applicable.

The surface energy of these various types of plastic films significantly differs and one problem has been heretofore that the dot diameter changes after ink deposition, depending on a recording medium. One embodiment of this invention enables to form an excellent high-defined image on a recording medium having a wide range of the surface energy of 35-60 mN/m, such as an OPP film and an OPS film of a small surface energy and a PET film of a relatively large surface energy.

In this invention, a long roll of (namely a web) recording medium is advantageously utilized, with respect to cost of the recording material such as expense of packaging and manufacturing, preparation efficiency for printing, and adaptability to various sizes of print.

In the image forming method of this invention, the above ink is ejected onto the recording medium with the ink-jet recording method, and an image is formed, after which the ink is cured by irradiation of active rays such as infrared rays.

(Total Ink Layer Thickness after Ink Deposition)

In this invention, the total ink layer thickness after ink has been deposited and cured by irradiation of active rays is preferably 2-20 μm. Specifically an active ray curable ink-jet recording in the screen printing field, the total ink layer thickness is exceeding 20 μm in the current situation, however in the soft packaging field in which the recording medium is often a thin plastic material in many cases, and there are problems of not only curling and wrinkling of the recording medium, but also stiffness and texture of the total printed medium are changed. Therefore, excessive ink ejection is not preferable. Herein, "the total ink layer thickness" means the maximum value of the ink layer thickness of the image printed onto the recording medium, and The total ink layer thickness in the same as that of a single color printing, and also of double overprinting (binary color), tri-color printing, and four color printing (being a white color base).

(Ejection Condition of Ink)

As ink ejection conditions to form the image employing the ink of this invention, it is preferable to eject the ink after the recording head and the ink are heated to 35-100° C. from the viewpoint of stability of ink ejection. The active ray curable ink exhibits a wide viscosity fluctuation with temperature changes, and this viscosity fluctuation directly affects largely to the ink droplet size and ink droplet ejection speed, resulting in image deterioration, and so, it is preferable to maintain the ink temperature constant while heating the ink. The control range of the ink temperature is (preset temperature ±5° C.), preferably (preset temperature ±2° C.), and still more preferably (preset temperature ±1° C.).

Further, in this invention, the droplet volume ejected from each nozzle is preferably 2-15 pl. Normally, to form a high precision image, it is essential that the ink droplet volume is in this range, but when the ink is ejected with this droplet volume, ink ejection stability mentioned above becomes specifically severe. However, according to this invention, when the ink is ejected with a small volume such as 1-15 pl of the ink droplet volume, ink ejection stability is enhanced, and the precision image can be stably formed.

(Irradiation Condition after Ink Deposition)

In the image forming method of this invention, as an irradiation condition of active rays, it is preferable to start active ray irradiation within 0.001-1.0 second after ink deposition, but more preferably within 0.001-0.5 second. To form the precision image, specifically important is that irradiation timing is fast as much as possible.

As an irradiation method of active rays, a basic method is disclosed in JP-A 60-132767. According to this, light sources are provided on both sides of a recording head, and the recording head and the light sources are reciprocally scanned via a shuttle method. Irradiation is conducted a specific time after ink deposition. Further, curing is completed by a separate undriven light source. In U.S. Pat. No. 6,145,979, disclosed are, a method utilizing an optical fiber, and a method in which a collimated light source is incident to a mirror arranged on the side of the recording head unit and UV light is irradiated on the recorded portion. In an image forming method of this invention, any one of these irradiation methods may be utilized.

(Ink-Jet Recording Apparatus)

Next, the ink-jet recording apparatus of this invention will be described.

In the following, the ink-jet recording apparatus of this invention will be described referring to appropriate drawings. Herein, the recording apparatus of the drawings is only one embodiment of the ink-jet recording apparatus of this invention, and the ink-jet recording apparatus of this invention is not limited to the drawings.

Figure 1:
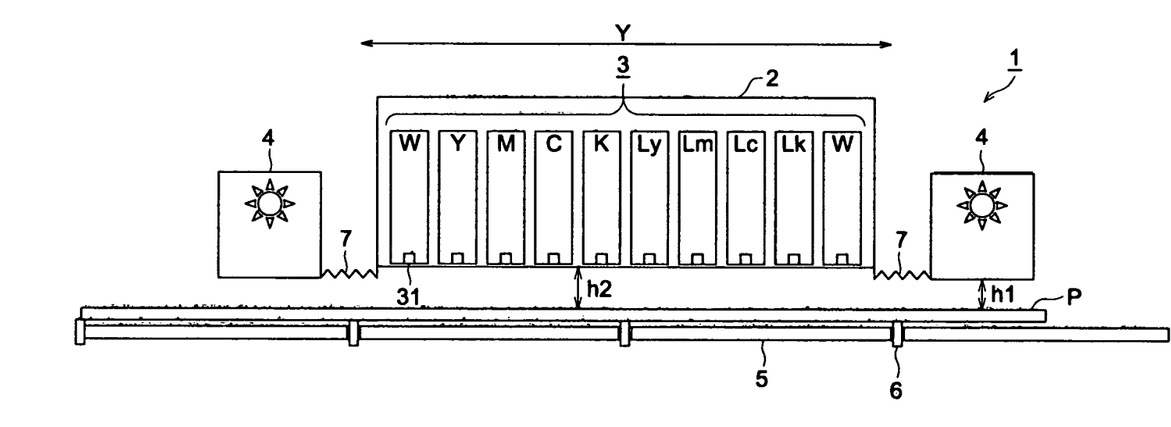
FIG. 1 A front view showing a major portion of a recording apparatus preferably employed in this invention.

FIG. 1 shows a front view of an embodiment of the primary portion of the recording apparatus of this invention. Recording apparatus 1 is constituted of such system as head carriage 2, recording head 3, irradiation means 4, and platen portion 5. In this recording apparatus 1, platen portion 5 is arranged below recording medium P. Platen portion 5 functions to absorb ultraviolet rays and to absorb excessive ultraviolet rays having passed through recording medium P. As a result, an image of high resolution can be consistently reproduced.

Recording medium P is guided by guide members 6 to be conveyed to the interior of FIG. 1 by operation of a transfer means (not shown in the drawing). A head scanning means (also not shown in the drawing) reciprocally scans recording head 3 mounted on head carriage 2 via shifting head carriage 2 along direction Y in FIG. 1.

Head carriage 2 is arranged above recording medium P to store a plural number of recording heads 3, which will be described later, corresponding to the number of colors required for targeted image printing on recording medium P while arranging the ejection outlet downward. Head carriage 2 is arranged to freely reciprocate within the main body of recording apparatus 1, and is shuttled back and forth along direction Y of FIG. 1, via a head scanning means drive.

Herein, in FIG. 1, head carriage 2 is drawn so as to store recording heads 3 of white (W), yellow (Y), magenta (M), cyan (C), black (K), light yellow (Ly), light magenta (Lm), light cyan (Lc), light black (Lb), and white (W), however, in practical use, the number of colors of recording heads 3 to be stored in head carriage 3 can be determined as appropriate.

Recording head 3 ejects active ray-curable ink-jet ink (for example, UV-curable ink), which has been supplied from an ink supply means (not shown in the drawing) onto recording medium P through an ejection outlet via operation of an ejection means (not shown in the drawing), a plural number of which are stored in recording head 3. UV ink, ejected from recording head 3, is comprised of such as a color material, a polymerizing monomer and an initiator, and further is provided with the capability of curing by cross-linking or polymerization of the monomer capable of catalytic reaction of the initiator due to irradiation of ultraviolet rays.

Recording head 3 ejects the ultraviolet ray-curable ink as ink drops on a predetermined region of recording medium (the region designated for ink deposition) to deposit ink drops on the targeted region during a scan of being shifted from one edge of recording medium P to the other edge of recording medium P along direction Y in FIG. 1 by a drive of the head scanning means.

After the above-described scan is performed an appropriate number of times to eject the ultraviolet ray-curable ink at a region designated for ink deposition, recording medium P is shifted farther to the interior of FIG. 1 by a shifting means and the ultraviolet ray curable ink is ejected onto the next region for ink deposition adjacent to the above-designated region while repeating another scan by a shifting the head scanning means again.

By repeating the above-described operations which eject ultraviolet ray-curable ink from recording head 3 synchronously with the head scanning means and the recording medium P transfer means, an image comprising an aggregate of ultraviolet curable ink drops is formed on recording medium P.

Irradiation means 4 of active rays is constituted of an ultraviolet lamp, which emits ultraviolet rays of a specific wavelength range at a stable exposure energy, and a filter, which allows passage of ultraviolet rays of only a specific wavelength region. Herein, as an ultraviolet lamp, such as a mercury lamp, a metal-halide lamp, an excimer laser, an ultraviolet laser, a cold-cathode tube, a black-light and an LED (being a Light Emitting Diode) are applicable, of which a metal-halide lamp, a cold-cathode tube, a mercury lamp or a black-light, all of which are belt-like, are applicable.

Irradiation means 4 is structured of a form approximately same as the maximum range which, can be accommodated by recording apparatus 1, or larger than the region designated to carry an image, among the regions to receive ultraviolet ray-curable ink ejected by recording head 3 during one scan by drive of the head scanning means.

Irradiation means 4 is arranged to be fixed nearly parallel to recording medium P on both sides of head carriage 2.

As described before, as a means to adjust illuminance onto ink ejection portions, the entire recording head 3 is of course light-shielded, and in addition, it is effective to set distance h2 between ink ejection portion 31 of recording head 3 and recording medium P to be larger than distance h1 between irradiation means 4 and recording medium P (h1<h2), or to increase distance d between recording head 3 and irradiation means 4 (for example, to make d larger). Further, it is more preferable to provide bellows structure 7 between recording head 3 and irradiation means 4.

Herein, the wavelength of ultraviolet rays emitted by irradiation means 4 can be optimized by changing the ultraviolet lamp or filter which is housed in irradiation means 4.

EXAMPLE

In the following, the present invention is specifically explained referring examples, but the embodiment of this invention is not limited these examples. Herein, in examples, "part" is "weight part", and "%" is "weight %", unless otherwise noted.

<Preparation of Pigment Dispersion>

Pigments were dispersed with the following compositions. The following two compounds were placed in a stainless beaker, after which the compounds were dissolved while stirred and heated on a 65° C. hot plate over one hour.

Dispersing agent PB822 (produced by Ajinomoto Fine-Techno Co., Inc.) 9 parts

Tetraethylene glycol diacrylate (bifunctional) 71 parts

The above mixture was cooled to ambient temperature, the following pigment of 20 parts was added, after which it was poured and stoppered tightly into a glass bottle together with 200 g of 0.5 mm diameter of zirconia beads, and then dispersion treatment was conducted via a paint shaker for the following hours. Subsequently, the zircinia beads were removed.

Pigment 1: Pigment Black 7 (#52, produced by Mitsubishi Chemical Corp.) 10 hours Pigment 2: Pigment Blue 15:4 (Blue No. 32, produced by Dainichiseika Color & Chemicals Mfg. Co., Ltd.) 6 hours Pigment 3: Pigment Yellow 180 (custom ordered, produced by Dainichiseika Color & Chemicals Mfg. Co., Ltd.) 10 hours Pigment 4: Pigment Red 122 (custom ordered, produced by Dainichiseika Color & Chemicals Mfg. Co., Ltd.) 10 hours <Preparation of Ink Composition>

Ink Sets 1-5 with compositions of Ink Compositions described in Tables 1-5 were prepared, and filtered employing a PP 3 μm disk filter manufactured by Roki Techno Co., Ltd.

Characteristics of each Ink Set were as follows.

Ink Set 1: Comparative example which did not contain a trifunctional acrylate compound having a partial structure of Formula (1)

Ink Set 2: Ink of this invention containing a bifunctional acrylate compound having a partial structure of Formula (1)

Ink Set 3: Ink of this invention containing a bifunctional acrylate compound having a partial structure of Formula (1) in the range of 30-80%

Ink Set 4: Ink of this invention containing a monofunctional acrylate compound and a bifunctional acrylate compound, together with a trifunctional acrylate compound having a partial structure of Formula (1)

Ink Set 5: Ink of this invention containing a bifunctional acrylate compound having a partial structure of Formula (1) in the range of 30-80%, and also a trifunctional acrylate compound and a monofunctional acrylate compound, both having a partial structure of Formula (1) Herein, viscosity of each Ink was shown in Tables. The values of each content in Tables were "weight parts".

TABLE 1

Ink Set 1 25° C. 33-36 mPa · s

| Ink Set Composition | | K | C | M | Y | Lk | Lc | Lm | Ly |
|---|---|---|---|---|---|---|---|---|---|
| Pigment No. | | 1 | 2 | 4 | 3 | 1 | 2 | 4 | 3 |
| Pigment Dispersion | | 20.0 | 20.0 | 21.0 | 17.5 | 5.0 | 5.0 | 5.3 | 4.4 |
| Photo polymerizable compound | Methoxypropylene glycol acrylate (monofunctional) | 15 | 15 | 15 | 15 | 15 | 15 | 15 | 15 |
| Photo polymerizable compound | Polypropylene glycol (containing PO)diacrylate (bifunctional) | 30.5 | 30.5 | 29.5 | 33.0 | 45.5 | 45.5 | 45.3 | 46.1 |
| Photo polymerizable compound | Trimethylolpropane triacrylate (trifunctional) | 30 | 30 | 30 | 30 | 30 | 30 | 30 | 30 |
| Photo radical initiator | Irgacure 1850, produced by Ciba Specialty Chemicals | 2 | 2 | 2 | 2 | 2 | 2 | 2 | 2 |
| Photo radical initiator | Irgacure 651, produced by Ciba Specialty Chemicals | 2 | 2 | 2 | 2 | 2 | 2 | 2 | 2 |
| Photo radical initiator | Diethylthioxanthone | 0.5 | 0.5 | 0.5 | 0.5 | 0.5 | 0.5 | 0.5 | 0.5 |

TABLE 2

Ink Set 2 25° C. 32-36 mPa · s

| Ink Set Composition | | K | C | M | Y | Lk | Lc | Lm | Ly |
|---|---|---|---|---|---|---|---|---|---|
| Pigment No. | | 1 | 2 | 4 | 3 | 1 | 2 | 4 | 3 |
| Pigment Dispersion | | 20.0 | 20.0 | 21.0 | 17.5 | 5.0 | 5.0 | 5.3 | 4.4 |
| Photo polymerizable compound | Methoxypropylene glycol acrylate (monofunctional) | 15 | 15 | 15 | 15 | 15 | 15 | 15 | 15 |
| Photo polymerizable compound | Polypropylene glycol (containing PO) diacrylate (bifunctional) | 30.5 | 30.5 | 29.5 | 33.0 | 45.5 | 45.5 | 45.3 | 46.1 |
| Photo polymerizable compound | Trimethylolpropane tripropylene oxide modified triacrylate (trifunctional) | 30 | 30 | 30 | 30 | 30 | 30 | 30 | 30 |
| Photo radical initiator | Irgacure 1850, produced by Ciba Specialty Chemicals | 2 | 2 | 2 | 2 | 2 | 2 | 2 | 2 |
| Photo radical initiator | Irgacure 651, produced by Ciba Specialty Chemicals | 2 | 2 | 2 | 2 | 2 | 2 | 2 | 2 |
| Photo radical initiator | Diethylthioxanthone | 0.5 | 0.5 | 0.5 | 0.5 | 0.5 | 0.5 | 0.5 | 0.5 |

TABLE 3

Ink Set 3 25° C. 31-33 mPa · s

| Ink Set Composition | | K | C | M | Y | Lk | Lc | Lm | Ly |
|---|---|---|---|---|---|---|---|---|---|
| Pigment No. | | 1 | 2 | 4 | 3 | 1 | 2 | 4 | 3 |
| Pigment Dispersion | | 20.0 | 20.0 | 21.0 | 17.5 | 5.0 | 5.0 | 5.3 | 4.4 |
| Photo polymerizable compound | Stearyl acrylate (monofunctional) | 20 | 20 | 20 | 20 | 20 | 20 | 20 | 20 |
| Photo polymerizable compound | Polyethylene glycol diacrylate (bifunctional) n = approximately 9 | 30.5 | 30.5 | 29.5 | 33.0 | 45.5 | 45.5 | 45.3 | 46.1 |
| Photo polymerizable compound | Trimethylolpropane triethylene oxide modified triacrylate (trifunctional) | 20 | 20 | 20 | 20 | 20 | 20 | 20 | 20 |
| Photo radical initiator | Irgacure 184, produced by Ciba Specialty Chemicals | 2 | 2 | 2 | 2 | 2 | 2 | 2 | 2 |

TABLE 3-continued

| Ink Set 3 25° C. 31-33 mPa · s | | | | | | | | | |
|---|---|---|---|---|---|---|---|---|---|
| Ink Set Composition | | K | C | M | Y | Lk | Lc | Lm | Ly |
| Photo radical initiator | Irgacure 651, produced by Ciba Specialty Chemicals | 2 | 2 | 2 | 2 | 2 | 2 | 2 | 2 |
| Photo radical initiator | Diethylthioxanthone | 0.5 | 0.5 | 0.5 | 0.5 | 0.5 | 0.5 | 0.5 | 0.5 |
| Amine compound | 4-(dimethylamino)benzoic acid ethyl ester | 5 | 5 | 5 | 5 | 5 | 5 | 5 | 5 |

TABLE 4

| Ink Set 4 25° C. 47-50 mPa · s | | | | | | | | | |
|---|---|---|---|---|---|---|---|---|---|
| Ink Set Composition | | K | C | M | Y | Lk | Lc | Lm | Ly |
| Pigment No. | | 1 | 2 | 4 | 3 | 1 | 2 | 4 | 3 |
| Pigment Dispersion | | 7.5 | 7.5 | 12.7 | 12.5 | 1.9 | 1.9 | 3.2 | 3.1 |
| Photo polymerizable compound | Ethoxydiethylene glycol acrylate (monofunctional) | 5 | 5 | 5 | 5 | 5 | 5 | 5 | 5 |
| Photo polymerizable compound | 1,6-hexanediol diacrylate (bifunctional) | 74.0 | 74.0 | 70.9 | 71.0 | 73.6 | 73.6 | 72.3 | 72.4 |
| Photo polymerizable compound | Triethylene glycol adduct pentaerythritol triacrylate (trifunctional) | 7 | 7 | 5 | 5 | 7 | 7 | 7 | 7 |
| Photo radical initiator | Irgacure 1800, produced by Ciba Specialty Chemicals | 2 | 2 | 2 | 2 | 2 | 2 | 2 | 2 |
| Photo radical initiator | Irgacure 500, produced by Ciba Specialty Chemicals | 2 | 2 | 2 | 2 | 2 | 2 | 2 | 2 |
| Photo radical initiator | Diethylthioxanthone | 0.5 | 0.5 | 0.5 | 0.5 | 0.5 | 0.5 | 0.5 | 0.5 |
| Photo polymerizable amine compound | 2-(dimethylamino)ethylmethacrylate | 2 | 2 | 2 | 2 | 8 | 8 | 8 | 8 |

TABLE 5

| Ink Set 5 25° C. 47-50 mPa · s | | | | | | | | | |
|---|---|---|---|---|---|---|---|---|---|
| Ink Set Composition | | K | C | M | Y | Lk | Lc | Lm | Ly |
| Pigment No. | | 1 | 2 | 4 | 3 | 1 | 2 | 4 | 3 |
| Pigment Dispersion | | 7.5 | 7.5 | 12.7 | 12.5 | 1.9 | 1.9 | 3.2 | 3.1 |
| Photo polymerizable compound | Ethoxydiethylene glycol acrylate (monofunctional) | 5 | 5 | 5 | 5 | 5 | 5 | 5 | 5 |
| Photo polymerizable compound | Tetraethylene glycol diacrylate (bifunctional) | 74.0 | 74.0 | 71.9 | 72.0 | 76.6 | 76.6 | 75.3 | 75.4 |
| Photo polymerizable compound | Trimethylolpropane triethylene oxide modified triacrylate (trifunctional) | 8 | 8 | 5 | 5 | 8 | 8 | 8 | 8 |
| Photo radical initiator | Irgacure 1800, produced by Ciba Specialty Chemicals | 1.5 | 1.5 | 1.5 | 1.5 | 1.5 | 1.5 | 1.5 | 1.5 |
| Photo radical initiator | Irgacure 500, produced by Ciba Specialty Chemicals | 1.5 | 1.5 | 1.5 | 1.5 | 1.5 | 1.5 | 1.5 | 1.5 |
| Photo radical initiator | Diethylthioxanthone | 0.5 | 0.5 | 0.5 | 0.5 | 0.5 | 0.5 | 0.5 | 0.5 |
| Photo polymerizable amine compound | 2-(dimethylamino)ethylmethacrylate | 2 | 2 | 2 | 2 | 5 | 5 | 5 | 5 |

<Ink-Jet Image Forming>

In an ink-jet recording apparatus featuring the constitution described in FIG. 1, which is equipped with piezo type ink-jet nozzles, each of Ink Sets 1-5 prepared above was employed and the following image recording was continuously performed on 500 m of a long roll of recording medium having a width of 600 mm as described in Table 6. "High-Resolution Color Digital Standard Image Data [N5.Bicycle]", published by Japanese Standard Association, December, 1995, was employed as an image data. The ink supply system was constituted of an ink tank, supply tubing, a pre-chamber ink tank immediately before the head, piping with a filter and a piezo head, of which a portion from the pre-chamber tank to the head was heat-insulated and heated to 50° C. Herein, the piezo head was driven so as to eject multi-sized dots of a liquid drop volume of 2-15 pl at a resolution of 720×720 dpi (dpi is a dot number per inch, that is, per 2.54 cm), whereby the above-described active ray curable composition ink was continuously ejected. Ink-jet ink, after having been deposited, was cured almost instantaneously (less than 1.0 second after deposition) via lamp units on both sides of the carriage. The total ink layer thickness after image formation was determined to be in the range of 2.3-13 μm. Herein, ink-jet image formation was performed according to the above-described method under environments of 25° C. and 50 RH.

The details of the abbreviated names of the recording media described in Table 6 were as follows.

OPP: Drawn polypropylene
PET: polyethylene terephthalate
CC paper: Cast-coated paper
s-OPS: Drawn polystyrene <Evaluation of Ink-Jet Recorded Image>

Each image recorded with the above image forming method was evaluated at the output of 1 m and 100 m whether images were stably formed.

<Curling of Recording Medium>

Curling of the recording medium after image formation (after cured) was visually evaluated on three grades.

A: No curling was noted.
B: Slight curling in the three color overlapped area (a thick layer area) was noted, but was rated at barely acceptable level.
C: Severe curling was noted, and was rated at a commercially unviable level.

<Color Mixing (Bleeding and Wrinkling)>

Further, printing was performed with 720 dpi (mentioned above) so that individual dots of colors Y, M, C and K were adjacent to each other, and each color dot was observed through a loupe to visually evaluate any state of bleeding and wrinkling, whereby color mixing (namely bleeding) was evaluated based on the following criteria of four levels.

A: The shape of adjacent dots showed a true circle with no bleeding.
B: The shape of adjacent dots exhibited an almost true circle, showing minimal bleeding.
C: Adjacent dots showed slight bleeding, and the circular shape of adjacent dots was slightly deformed, and was rated at minimally viable level.
D: Adjacent dots showed obvious bleeding and were blended into each other, and wrinkles were generated at the superposed portions, and was rated at a commercially unviable level.

Each evaluation results are shown in Table 7.

TABLE 6

| Sample No. | Ink Set | Recording medium | Light source | Recording apparatus | Illuminance & peak wavelength |
|---|---|---|---|---|---|
| 1 (Comp.) | 1 | OPP | MHL(Vzero085) 3 kW P/S | FIG. 1 | 4,000 mW/cm² at 254 nm |
| 2 (Comp.) | 1 | PET | MHL(Vzero085) 3 kW P/S | FIG. 1 | 4,000 mW/cm² at 254 nm |
| 3 (Comp.) | 1 | s-OPS | MHL(Vzero085) 3 kW P/S | FIG. 1 | 4,000 mW/cm² at 254 nm |
| 4 (Comp.) | 1 | CC PAPER | MHL(Vzero085) 3 kW P/S | FIG. 1 | 4,000 mW/cm² at 254 nm² |
| 5 (Inv.) | 2 | OPP | MHL(Vzero085) 3 kW P/S | FIG. 1 | 4,000 mW/cm² at 254 nm |
| 6 (Inv.) | 2 | PET | MHL(Vzero085) 3 kW P/S | FIG. 1 | 4,000 mW/cm² at 254 nm |
| 7 (Inv.) | 2 | s-OPS | MHL(Vzero085) 3 Kw P/S | FIG. 1 | 4,000 mW/cm² at 254 nm |
| 8 (Inv.) | 2 | CC PAPER | MHL(Vzero085) 3 kW P/S | FIG. 1 | 4,000 mW/cm² at 254 nm |
| 9 (Inv.) | 3 | OPP | MHL(Vzero085) 3 kW P/S | FIG. 1 | 4,000 mW/cm² at 254 nm |
| 10 (Inv.) | 3 | PET | MHL(Vzero085) 3 kWP/S | FIG. 1 | 4,000 mW/cm² at 254 nm |
| 11 (Inv.) | 3 | s-OPS | MHL(Vzero085) 3 kW P/S | FIG. 1 | 4,000 mW/cm² at 254 nm |
| 12 (Inv.) | 3 | CC PAPER | MHL(Vzero085) 3 kW P/S | FIG. 1 | 4,000 mW/cm² at 254 nm |
| 13 (Inv.) | 4 | OPP | MHL(Vzero085) 3 kW P/S | FIG. 1 | 4,000 mW/cm² at 254 nm |
| 14 (Inv.) | 4 | PET | MHL(Vzero085) 3 kW P/S | FIG. 1 | 4,000 mW/cm² at 254 nm |
| 15 (Inv.) | 4 | S-OPS | MHL(Vzero085) 3 kW P/S | FIG. 1 | 4,000 mW/cm² at 254 nm |

TABLE 6-continued

| | | | Irradiation Condition | | |
|---|---|---|---|---|---|
| Sample No. | Ink Set | Recording medium | Light source | Recording apparatus | Illuminance & peak wavelength |
| 16 (Inv.) | 4 | CC PAPER | MHL(Vzero085) 3 kW P/S | FIG. 1 | 4,000 mW/cm$^2$ at 254 nm |
| 17 (Inv.) | 5 | OPP | MHL(Vzero085) 3 kW P/S | FIG. 1 | 4,000 mW/cm$^2$ at 254 nm |
| 18 (Inv.) | 5 | PET | MHL(Vzero085) 3 kW P/S | FIG. 1 | 4,000 mW/cm$^2$ at 254 nm |
| 19 (Inv.) | 5 | s-OPS | MHL(Vzero085) 3 kW P/S | FIG. 1 | 4,000 mW/cm$^2$ at 254 nm |
| 20 (Inv.) | 5 | CC PAPER | MHL(Vzero085) 3 kW P/S | FIG. 1 | 4,000 mW/cm$^2$ at 254 nm |

Comp.: comparative example, Inv.: this invention,
P/S: power source

MHL: Metal halide lamp
Illuminance: Illuminance at 254 nm on the recording medium surface, employing UVPF-A1, manufactured by Iwasaki Electric Co., Ltd.

TABLE 7

| Sample No. | Curling | Color mixing, Wrinkling |
|---|---|---|
| 1(Comp.) | C | B |
| 2(Comp.) | C | C |
| 3(Comp.) | C | B |
| 4(Comp.) | B | B |
| 5(Inv.) | A | B |
| 6(Comp.) | A | B |
| 7(Comp.) | B | C |
| 8(Comp.) | A | C |
| 9(Inv.) | A | B |
| 10(Inv.) | A | B |
| 11(Inv.) | A | B |
| 12(Inv.) | A | A |
| 13(Inv.) | A | B |
| 14(Inv.) | A | B |
| 15(Inv.) | A | B |
| 16(Inv.) | A | B |
| 17(Inv.) | A | A |
| 18(Inv.) | A | A |
| 19(Inv.) | A | B |
| 20(Inv.) | A | A |

It is clear from the results that it is possible to print a highly precise image onto any kind of the recording medium according to the ink and the image forming method of this invention.

What is claimed is:

1. An active ray curable ink-jet ink comprising a multifunctional acrylate or methacrylate of at least three functional groups, the multifunctional acrylate or methacrylate having a partial structure of the following Formula (1) in an amount of 10-30 weight % based on the total weight of the active ray curable ink-jet ink:

Formula (1)

wherein R is an alkylene group of —CH$_2$CH$_2$—, or —CH$_2$CH(CH$_3$)—, and n is 3, and
the ink-jet ink further comprising a bifunctional acrylate or methacrylate having a partial structure of Formula (1) in an amount of 30-80 weight % based on the total weight of the ink-jet, provided that a sum of the multifunctional acrylate or methacrylate of at least three functional groups and the bifunctional acrylate or methacrylate is from 40 to 100 weight %.

2. The active ray curable ink-jet ink described in claim 1, further comprising a monofunctional acrylate or methacrylate compound, a content [M (weight %)] of which is 0<M<20, and a sum of the monofunctional acrylate or methacrylate compound and the bifunctional acrylate or methacrylate is in an amount of 70 to 90 weight % based on the total weight of the ink-jet ink.

3. The active ray curable ink-jet ink described in claim 1, further comprising at least one kind of tertiary amine compound.

4. The active ray curable ink-jet ink described in claim 1, further comprising at least one kind of photopolymerizable tertiary amine monomer.

5. The active ray curable ink-jet ink described in claim 1, wherein the ink-jet ink exhibits a viscosity of 10-70 mPa·s at 25° C.

6. An image forming method comprising the steps of:
(a) ejecting the active ray curable ink-jet ink described in claim 1 from an ink-jet recording head onto a recording medium, and
(b) curing the ejected ink to form an image,
wherein active rays are irradiated between 0.001-1.0 second after the ejected active ray curable ink-jet ink is deposited onto the recording medium.

7. The image forming method described in claim 6, wherein the total thickness of the cured ink layer is 2-20 μm.

8. The image forming method described in claim 6, wherein the recording medium is a non-absorbable recording medium.

9. An image forming method comprising the steps of:
(a) ejecting the active ray curable ink-jet ink described in claim 1 from nozzles of an ink-jet recording head onto a recording medium, and
(b) curing the ejected ink to form an image,
wherein a droplet volume of ink ejected from the nozzles is 1-15 pl.

* * * * *